(12) United States Patent
Jadhav

(10) Patent No.: US 11,851,605 B2
(45) Date of Patent: Dec. 26, 2023

(54) STABLE SUSPENSION OF ELASTOMER PARTICLES FOR USE IN A CEMENT SLURRY

(71) Applicant: Halliburton Energy Services, Inc., Houston, TX (US)

(72) Inventor: Rahul Nandkumar Jadhav, Pune (IN)

(73) Assignee: Halliburton Energy Services, Inc., Houston, TX (US)

(*) Notice: Subject to any disclaimer, the term of this patent is extended or adjusted under 35 U.S.C. 154(b) by 304 days.

(21) Appl. No.: 16/637,626

(22) PCT Filed: Apr. 8, 2019

(86) PCT No.: PCT/US2019/026362
§ 371 (c)(1),
(2) Date: Feb. 7, 2020

(87) PCT Pub. No.: WO2020/209831
PCT Pub. Date: Oct. 15, 2020

(65) Prior Publication Data
US 2021/0253931 A1    Aug. 19, 2021

(51) Int. Cl.
*C09K 8/467* (2006.01)
*C04B 22/00* (2006.01)
(Continued)

(52) U.S. Cl.
CPC .......... *C09K 8/467* (2013.01); *C04B 22/0093* (2013.01); *C04B 22/062* (2013.01);
(Continued)

(58) Field of Classification Search
CPC ................ C09K 8/467; C04B 22/0093; C04B 22/062; C04B 24/023; C04B 24/267;
(Continued)

(56) References Cited

U.S. PATENT DOCUMENTS

| 6,668,929 B2 | 12/2003 | Griffith et al. |
| 7,740,070 B2 | 6/2010 | Santra et al. |

(Continued)

FOREIGN PATENT DOCUMENTS

| EP | 1348832 A1 | 10/2003 |
| EP | 3814448 A1 | 5/2021 |
| WO | 2007074330 A1 | 7/2007 |
| WO | 2016154363 A1 | 9/2016 |

OTHER PUBLICATIONS

International Search Report and Written Opinion dated Jan. 6, 2020, International PCT Application No. PCT/US2019/026362.

*Primary Examiner* — Crystal J. Lee
(74) *Attorney, Agent, or Firm* — Barnes & Thornburg LLP

(57) ABSTRACT

Suspensions of elastomer particles for cement compositions and associated methods of cementing. An example method includes providing a suspension of elastomer particles. The suspension of elastomer particles includes elastomer particles, an aqueous fluid, a viscosifier, a surfactant, and a clay-based stabilizer. The suspension may be combined with a cement slurry to form a cement composition. The cement slurry includes a cement and a base fluid. The cement composition may be introduced into a wellbore penetrating a subterranean formation. The cement composition may be allowed to set in the wellbore.

20 Claims, 3 Drawing Sheets

(51) Int. Cl.

| | |
|---|---|
| *C04B 22/06* | (2006.01) |
| *C04B 24/02* | (2006.01) |
| *C04B 24/26* | (2006.01) |
| *C04B 24/38* | (2006.01) |
| *C04B 28/02* | (2006.01) |
| *C04B 40/00* | (2006.01) |
| *E21B 33/14* | (2006.01) |
| *C04B 103/40* | (2006.01) |
| *C04B 103/44* | (2006.01) |

(52) U.S. Cl.
CPC ........ *C04B 24/023* (2013.01); *C04B 24/2676* (2013.01); *C04B 24/38* (2013.01); *C04B 28/02* (2013.01); *C04B 40/0046* (2013.01); *E21B 33/14* (2013.01); *C04B 2103/40* (2013.01); *C04B 2103/44* (2013.01)

(58) Field of Classification Search
CPC ..... C04B 24/38; C04B 28/02; C04B 40/0046; C04B 2103/40; C04B 2103/44; E21B 33/14

See application file for complete search history.

(56) References Cited

U.S. PATENT DOCUMENTS

| | | | |
|---|---|---|---|
| 9,120,918 B2 | 9/2015 | Soddemann et al. | |
| 2008/0017376 A1* | 1/2008 | Badalamenti | C09K 8/487 166/292 |
| 2012/0152540 A1 | 6/2012 | Patil et al. | |
| 2014/0090843 A1* | 4/2014 | Boul | C04B 40/0658 106/793 |
| 2016/0160109 A1 | 6/2016 | Patil et al. | |
| 2016/0264838 A1* | 9/2016 | Nelson | C04B 28/02 |
| 2016/0264842 A1* | 9/2016 | Miller | E21B 33/14 |

* cited by examiner

STABLE SUSPENSION OF ELASTOMER PARTICLES FOR USE IN A CEMENT SLURRY

TECHNICAL FIELD

The present disclosure relates generally to cementing operations, and more particularly, to forming a stable suspension of elastomer particles for use in oil well cement slurries without dry blending the elastomer particles with the cement.

BACKGROUND

Cement compositions may be used in a variety of subterranean applications. In subterranean well construction, a pipe string (e.g., casing, liners, expandable tubulars, etc.) may be run into a wellbore and cemented in place. The process of cementing the pipe string in place is commonly referred to as "primary cementing." In a typical primary cementing operation, a cement composition may be pumped into an annulus between the walls of the wellbore and the exterior surface of the pipe string. The cement composition sets in the annular space, forming an annular sheath of hardened, substantially impermeable cement that may support and position the pipe string in the wellbore and may bond the exterior surface of the pipe string to the subterranean formation. Among other things, this cement sheath prevents the migration of fluids in the annulus and protects the pipe string from corrosion. Cement compositions may also be used in remedial cementing methods. For example, cement compositions may be used to seal cracks or holes in pipe strings or cement sheaths, to seal highly permeable formation zones or fractures, or to place a cement plug.

Elastomer particles may be added to a cement to improve the elasticity of the set cement sheath. Elastomer particles may be hydrophobic in nature and may float when added to aqueous solutions or slurries, which may increase the difficulty of making a stable homogenous suspension of the elastomer particles in aqueous fluids. When dry blended with a cement, the elastomer particles may have a tendency to separate out to the top of the dry blend, which may increase the difficulty of making a homogenous dry blend of the elastomer particles and the cement. The present disclosure provides improved methods and compositions for forming stable suspensions of elastomer particles for use in cement slurries without having to dry blend the elastomer particles with the cement.

BRIEF DESCRIPTION OF THE DRAWINGS

Illustrative examples of the present disclosure are described in detail below with reference to the attached drawing figures, which are incorporated by reference herein, and wherein.

Figure 1:
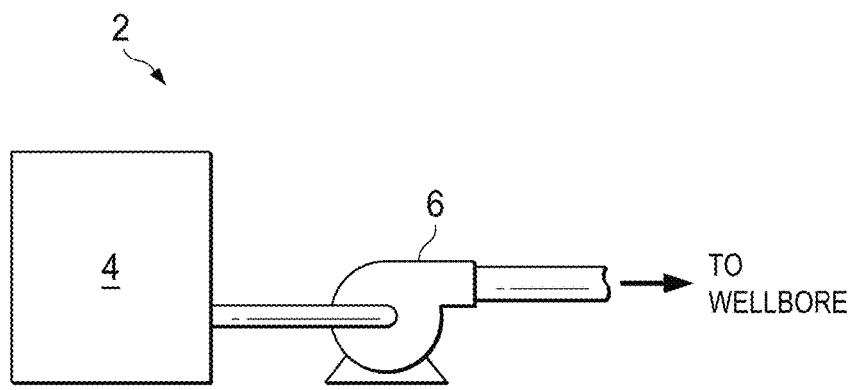
FIG. 1 is a schematic illustrating a system for the preparation and delivery of a cement composition to a wellbore in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to cementing operations, and more particularly, to forming a stable suspension of elastomer particles for use in oil well cement slurries without dry blending the elastomer particles with the cement.

In the following detailed description of several illustrative examples, reference is made to the accompanying drawings that form a part hereof, and in which is shown by way of illustration examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present disclosure. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The examples described herein relate to the use of cement compositions in wellbore operations. The cement compositions may be introduced into a wellbore penetrating a subterranean formation. The subterranean formation may be a subterranean formation subject to or intended to be subject to a cementing operation. Advantageously, the cement compositions comprise elastomer particles. The elastomer particles are combined with a cement slurry as a stable suspension. The stable suspension of the elastomer particles may be combined with a cement slurry to form a cement composition. Advantageously, the elastomer particles are formed as a stable suspension separate from the cement slurry and as such, there is no need to dry blend the solid elastomer particles with the dry blend cement components. The stable suspension of elastomer particles may be stored as a stable suspension and combined with the cement slurry when the cement composition is desired for use. Further advantageously, the suspension of elastomer particles may remain stable for a time period exceeding sixty days as statically stored without agitation. An additional advantage is that the dry blending operation to provide the cement composition may be eliminated altogether if all additives are in liquid form. This may reduce the overall operation time of the cementing operation. A further advantage may be improved mixability of the elastomer particle suspension with the cement components as compared with dry blending the solid elastomer particles with the cement components. This improved mixability may allow for a reduction in the difficulty of homogenizing the cement composition. A still further advantage is that the elastomer particle suspension may be easier to handle by well site personnel and may require less storage space at the well site.

The cement composition comprises a suspension of elastomer particles. The suspension of elastomer particles comprises the elastomer particles, a viscosifier, a clay-based stabilizer, a surfactant, and an aqueous fluid.

Generally, the elastomer particles described herein may be used to impart elasticity to the set cement produced from the cement compositions described herein. The elastomers described herein may be used in particulate form. As used herein, the term "particulate" refers to materials in solid state having a well-defined physical shape, including regular and irregular geometries. The elastomer particles may have the shape of, for example, platelets, shavings, fibers, flakes, ribbons, rods, strips, spheroids, hollow beads, toroids, pellets, tablets, or any other physical shape. Examples of the elastomer particles generally include, but are not limited to, particles of styrene butadiene, natural rubber, nitrile rubber, butyl rubber, ethylene propylene diene rubber (hereafter "EPDM" rubber), ethylene propylene rubber (hereafter "EPM" rubber), chlorinated polyethylene rubber, polyurethane rubber, polyisoprene rubber, polybutadiene rubber, polyisobutylene rubber, acrylonitrilebutadiene rubber, acrylonitrile-styrene-butadiene rubber, or any combination thereof.

The suspension of elastomer particles may be combined with a cement slurry to provide the cement composition. The elastomer particles may first be prepared as the stable suspension having a desired concentration of elastomer particles. The elastomer particles may be present in the suspension in a concentration sufficient for the suspension of elastomer particles to be sufficiently stable for a desired duration. As an example, a 20% (w/w) aqueous suspension of the elastomer particles may be prepared. The concentration of the elastomer particles in the suspension is at least a factor of the elastomer particles, viscosifier, clay-based stabilizer, and surfactant selected for use as well as the respective concentrations of these components. The suspension of elastomer particles is characterized as "stable" when it may be stored under ambient conditions (i.e., about 80° F.) as a uniform suspension for at least about one day in quiescent storage without agitation. Agitation includes mixing and/or shaking the suspension to prevent the elastomer particles from floating. In some examples, the suspension may remain stable for about 1 day, about 2 days, about 3 days, about 5 days, about 1 week, about 2 weeks, about 4 weeks, about 2 months, about 3 months, about 4 months, about 5 months, about 6 months, or longer. The stable suspension remains in a pourable fluid state without agitation. The stable suspension does not exhibit visible signs of phase separation during the storage of the suspension under ambient conditions. For example, the stable suspension remains uniform and does not separate into layers or form a crust of floating elastomer particles after storage of about 1 day, about 2 days, about 3 days, about 5 days, about 1 week, about 2 weeks, about 4 weeks, about 2 months, about 3 months, about 4 months, about 5 months, about 6 months, or longer.

The concentration of the elastomer particles in the suspension may range from about 0.1% (w/w) to about 40% (w/w). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the elastomer particles in the suspension may range from about 0.1% (w/w) to about 40% (w/w), from about 0.5% (w/w) to about 40% (w/w), from about 1% (w/w) to about 40% (w/w), from about 2% (w/w) to about 40% (w/w), from about 3% (w/w) to about 40% (w/w), from about 4% (w/w) to about 40% (w/w), from about 5% (w/w) to about 40% (w/w), from about 6% (w/w) to about 40% (w/w), from about 7% (w/w) to about 40% (w/w), from about 8% (w/w) to about 40% (w/w), from about 9% (w/w) to about 40% (w/w), from about 10% (w/w) to about 40% (w/w), from about 11% (w/w) to about 40% (w/w), from about 12% (w/w) to about 40% (w/w), from about 13% (w/w) to about 40% (w/w), from about 14% (w/w) to about 40% (w/w), from about 15% (w/w) to about 40% (w/w), from about 16% (w/w) to about 40% (w/w), from about 17% (w/w) to about 40% (w/w), from about 18% (w/w) to about 40% (w/w), from about 19% (w/w) to about 40% (w/w), from about 20% (w/w) to about 40% (w/w), from about 21% (w/w) to about 40% (w/w), from about 22% (w/w) to about 40% (w/w), from about 23% (w/w) to about 40% (w/w), from about 24% (w/w) to about 40% (w/w), from about 25% (w/w) to about 40% (w/w), from about 26% (w/w) to about 40% (w/w), from about 27% (w/w) to about 40% (w/w), from about 28% (w/w) to about 40% (w/w), from about 29% (w/w) to about 40% (w/w), from about 30% (w/w) to about 40% (w/w), from about 31% (w/w) to about 40% (w/w), from about 32% (w/w) to about 40% (w/w), from about 33% (w/w) to about 40% (w/w), from about 34%

(w/w) to about 40% (w/w), from about 35% (w/w) to about 40% (w/w), from about 36% (w/w) to about 40% (w/w), from about 37% (w/w) to about 40% (w/w), from about 38% (w/w) to about 40% (w/w), or from about 39% (w/w) to about 40% (w/w). As another example, the concentration of the elastomer particles in the suspension may range from about 0.1% (w/w) to about 40% (w/w), from about 0.1% (w/w) to about 39% (w/w), from about 0.1% (w/w) to about 38% (w/w), from about 0.1% (w/w) to about 37% (w/w), from about 0.1% (w/w) to about 36% (w/w), from about 0.1% (w/w) to about 35% (w/w), from about 0.1% (w/w) to about 34% (w/w), from about 0.1% (w/w) to about 33% (w/w), from about 0.1% (w/w) to about 32% (w/w), from about 0.1% (w/w) to about 31% (w/w), from about 0.1% (w/w) to about 30% (w/w), from about 0.1% (w/w) to about 29% (w/w), from about 0.1% (w/w) to about 28% (w/w), from about 0.1% (w/w) to about 27% (w/w), from about 0.1% (w/w) to about 26% (w/w), from about 0.1% (w/w) to about 25% (w/w), from about 0.1% (w/w) to about 24% (w/w), from about 0.1% (w/w) to about 23% (w/w), from about 0.1% (w/w) to about 22% (w/w), from about 0.1% (w/w) to about 21% (w/w), from about 0.1% (w/w) to about 20% (w/w), from about 0.1% (w/w) to about 19% (w/w), from about 0.1% (w/w) to about 18% (w/w), from about 0.1% (w/w) to about 17% (w/w), from about 0.1% (w/w) to about 16% (w/w), from about 0.1% (w/w) to about 15% (w/w), from about 0.1% (w/w) to about 14% (w/w), from about 0.1% (w/w) to about 13% (w/w), from about 0.1% (w/w) to about 12% (w/w), from about 0.1% (w/w) to about 11% (w/w), from about 0.1% (w/w) to about 10% (w/w), from about 0.1% (w/w) to about 9% (w/w), from about 0.1% (w/w) to about 8% (w/w), from about 0.1% (w/w) to about 7% (w/w), from about 0.1% (w/w) to about 6% (w/w), from about 0.1% (w/w) to about 5% (w/w), from about 0.1% (w/w) to about 4% (w/w), from about 0.1% (w/w) to about 3% (w/w), from about 0.1% (w/w) to about 2% (w/w), from about 0.1% (w/w) to about 1% (w/w), or from about 0.1% (w/w) to about 0.5% (w/w). With the benefit of this disclosure, one of ordinary skill in the art will be readily able to prepare a suspension having a sufficient concentration of the elastomer particles for a given application.

After the suspension of elastomer particles is combined with the cement slurry to provide the cement composition, the concentration of the elastomer particles in the cement composition may range from about 0.1% (w/w) to about 30% (w/w). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the elastomer particles in the cement composition may range from about 0.1% (w/w) to about 30% (w/w), from about 0.5% (w/w) to about 30% (w/w), from about 1% (w/w) to about 30% (w/w), from about 2% (w/w) to about 30% (w/w), from about 3% (w/w) to about 30% (w/w), from about 4% (w/w) to about 30% (w/w), from about 5% (w/w) to about 30% (w/w), from about 6% (w/w) to about 30% (w/w), from about 7% (w/w) to about 30% (w/w), from about 8% (w/w) to about 30% (w/w), from about 9% (w/w) to about 30% (w/w), from about 10% (w/w) to about 30% (w/w), from about 11% (w/w) to about 30% (w/w), from about 12% (w/w) to about 30% (w/w), from about 13% (w/w) to about 30% (w/w), from about 14% (w/w) to about 30% (w/w), from about 15% (w/w) to about 30% (w/w), from about 16% (w/w) to about 30% (w/w), from about 17% (w/w) to about 30% (w/w), from about 18% (w/w) to about 30% (w/w), from about 19% (w/w) to about 30% (w/w), from about 20% (w/w) to about 30% (w/w), from about 21% (w/w) to about 30% (w/w), from about 22% (w/w) to about 30% (w/w), from about 23% (w/w) to about 30% (w/w), from about 24% (w/w) to about 30% (w/w), from about 25% (w/w) to about 30% (w/w), from about 26% (w/w) to about 30% (w/w), from about 27% (w/w) to about 30% (w/w), from about 28% (w/w) to about 30% (w/w), or from about 29% (w/w) to about 30% (w/w). As another example, the concentration of the elastomer particles in the cement composition may range from about 0.1% (w/w) to about 30% (w/w), from about 0.1% (w/w) to about 29% (w/w), from about 0.1% (w/w) to about 28% (w/w), from about 0.1% (w/w) to about 27% (w/w), from about 0.1% (w/w) to about 26% (w/w), from about 0.1% (w/w) to about 25% (w/w), from about 0.1% (w/w) to about 24% (w/w), from about 0.1% (w/w) to about 23% (w/w), from about 0.1% (w/w) to about 22% (w/w), from about 0.1% (w/w) to about 21% (w/w), from about 0.1% (w/w) to about 20% (w/w), from about 0.1% (w/w) to about 19% (w/w), from about 0.1% (w/w) to about 18% (w/w), from about 0.1% (w/w) to about 17% (w/w), from about 0.1% (w/w) to about 16% (w/w), from about 0.1% (w/w) to about 15% (w/w), from about 0.1% (w/w) to about 14% (w/w), from about 0.1% (w/w) to about 13% (w/w), from about 0.1% (w/w) to about 12% (w/w), from about 0.1% (w/w) to about 11% (w/w), from about 0.1% (w/w) to about 10% (w/w), from about 0.1% (w/w) to about 9% (w/w), from about 0.1% (w/w) to about 8% (w/w), from about 0.1% (w/w) to about 7% (w/w), from about 0.1% (w/w) to about 6% (w/w), from about 0.1% (w/w) to about 5% (w/w), from about 0.1% (w/w) to about 4% (w/w), from about 0.1% (w/w) to about 3% (w/w), from about 0.1% (w/w) to about 2% (w/w), from about 0.1% (w/w) to about 1% (w/w), or from about 0.1% (w/w) to about 0.5% (w/w). With the benefit of this disclosure, one of ordinary skill in the art will be readily able to prepare a cement composition having a sufficient concentration of the elastomer particles for a given application.

The elastomer particle suspension further comprises a surfactant. Generally, the surfactant may be used to maintain homogeneity of the suspension and prevent the elastomer particles from floating. Examples of the surfactant generally include, but are not limited to, anionic surfactants, non-ionic surfactants, or a combination thereof. Specific examples of the surfactant include, but are not limited to, ethoxylated nonylphenol including ethoxylated nonylphenol with varying moles of ethylene oxide, triethanolamine, polyethylene glycol, polypropylene glycol, sulfonated acetone formaldehyde condensate, a fatty acid amine condensate, or any combination thereof.

The concentration of the viscosifier in the suspension may range from about 0.01% (w/w) to about 5% (w/w). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the viscosifier in the suspension may range from about 0.01% (w/w) to about 5% (w/w), from about 0.02% (w/w) to about 5% (w/w), from about 0.03% (w/w) to about 5% (w/w), from about 0.04%

(w/w) to about 5% (w/w), from about 0.05% (w/w) to about 5% (w/w), from about 0.06% (w/w) to about 5% (w/w), from about 0.07% (w/w) to about 5% (w/w), from about 0.08% (w/w) to about 5% (w/w), from about 0.09% (w/w) to about 5% (w/w), from about 0.1% (w/w) to about 5% (w/w), from about 0.2% (w/w) to about 5% (w/w), from about 0.3% (w/w) to about 5% (w/w), from about 0.4% (w/w) to about 5% (w/w), from about 0.5% (w/w) to about 5% (w/w), from about 0.6% (w/w) to about 5% (w/w), from about 0.7% (w/w) to about 5% (w/w), from about 0.8% (w/w) to about 5% (w/w), from about 0.9% (w/w) to about 5% (w/w), from about 1% (w/w) to about 5% (w/w), from about 2% (w/w) to about 5% (w/w), from about 3% (w/w) to about 5% (w/w), or from about 4% (w/w) to about 5% (w/w). As another example, the concentration of the viscosifier in the suspension may range from about 0.01% (w/w) to about 5% (w/w), from about 0.01% (w/w) to about 4% (w/w), from about 0.01% (w/w) to about 3% (w/w), from about 0.01% (w/w) to about 2% (w/w), from about 0.01% (w/w) to about 1% (w/w), from about 0.01% (w/w) to about 0.9% (w/w), from about 0.01% (w/w) to about 0.8% (w/w), from about 0.01% (w/w) to about 0.7% (w/w), from about 0.01% (w/w) to about 0.6% (w/w), from about 0.01% (w/w) to about 0.5% (w/w), from about 0.01% (w/w) to about 0.4% (w/w), from about 0.01% (w/w) to about 0.3% (w/w), from about 0.01% (w/w) to about 0.2% (w/w), from about 0.01% (w/w) to about 0.1% (w/w), from about 0.01% (w/w) to about 0.09% (w/w), from about 0.01% (w/w) to about 0.08% (w/w), from about 0.01% (w/w) to about 0.07% (w/w), from about 0.01% (w/w) to about 0.06% (w/w), from about 0.01% (w/w) to about 0.05% (w/w), from about 0.01% (w/w) to about 0.04% (w/w), from about 0.01% (w/w) to about 0.03% (w/w), or from about 0.01% (w/w) to about 0.02% (w/w). With the benefit of this disclosure, one of ordinary skill in the art will be readily able to prepare a suspension having a sufficient concentration of viscosifier for a given application.

The elastomer particle suspension further comprises a clay-based stabilizer. Generally, the clay-based stabilizer may be used to maintain homogeneity of the suspension and prevent the elastomer particles from floating. Examples of the clay-based stabilizer generally include, but are not limited to, magnesium silicate clay, bentonite, sepiolite, attapulgite, phyllosilicates, smectite, hectorites, or any combination thereof. In some examples, the clay-based stabilizer may be synthetic. A specific example of a synthetic clay-based stabilizer is a synthetic magnesium silicate clay, such as clays of lithium magnesium sodium silicates or lithium magnesium sodium fluorosilicates.

In some examples, the clay-based stabilizer may comprise clay platelets. In some further examples, the clay platelets may be exfoliated prior to or may become exfoliated upon addition to the suspension. The clay platelets may have an average diameter of about 10 nm to about 2000 nm and an average thickness of about 0.5 nm to about 2 nm (including subsets of either range). In some additional examples, the clay-based stabilizer may comprise aggregates of clay platelets having an average diameter of about 100 nm to about 3 microns. As used herein, the term "average diameter" refers to a d50 by volume. As used herein, the term "d50" refers to a diameter of which 50% of the particles in the sample are smaller. In some examples, the clay platelets may have an average diameter of about 10 nm to about 50 nm and an average thickness of about 0.5 nm to about 2 nm. In some examples, the clay platelets may have a diameter of about 500 nm to about 2000 nm and an average thickness of about 0.5 nm to about 2 nm. In some examples, the aspect ratio (diameter/thickness ratio) of the clay platelets may be about 5 to about 4000.

The concentration of the clay-based stabilizer in the suspension may range from about 0.01% (w/w) to about 10% (w/w). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the clay-based stabilizer in the suspension may range from about 0.01% (w/w) to about 10% (w/w), from about 0.02% (w/w) to about 10% (w/w), from about 0.03% (w/w) to about 10% (w/w), from about 0.04% (w/w) to about 10% (w/w), from about 0.05% (w/w) to about 10% (w/w), from about 0.06% (w/w) to about 10% (w/w), from about 0.07% (w/w) to about 10% (w/w), from about 0.08% (w/w) to about 10% (w/w), from about 0.09% (w/w) to about 10% (w/w), from about 0.1% (w/w) to about 10% (w/w), from about 0.2% (w/w) to about 10% (w/w), from about 0.3% (w/w) to about 10% (w/w), from about 0.4% (w/w) to about 10% (w/w), from about 0.5% (w/w) to about 10% (w/w), from about 0.6% (w/w) to about 10% (w/w), from about 0.7% (w/w) to about 10% (w/w), from about 0.8% (w/w) to about 10% (w/w), from about 0.9% (w/w) to about 10% (w/w), from about 1% (w/w) to about 10% (w/w), from about 2% (w/w) to about 10% (w/w), from about 3% (w/w) to about 10% (w/w), from about 4% (w/w) to about 10% (w/w), from about 5% (w/w) to about 10% (w/w), from about 6% (w/w) to about 10% (w/w), from about 7% (w/w) to about 10% (w/w), from about 8% (w/w) to about 10% (w/w), or from about 9% (w/w) to about 10% (w/w). As another example, the concentration of the clay-based stabilizer in the suspension may range from about 0.01% (w/w) to about 10% (w/w), from about 0.01% (w/w) to about 9% (w/w), from about 0.01% (w/w) to about 8% (w/w), from about 0.01% (w/w) to about 7% (w/w), from about 0.01% (w/w) to about 6% (w/w), from about 0.01% (w/w) to about 5% (w/w), from about 0.01% (w/w) to about 4% (w/w), from about 0.01% (w/w) to about 3% (w/w), from about 0.01% (w/w) to about 2% (w/w), from about 0.01% (w/w) to about 1% (w/w), from about 0.01% (w/w) to about 0.9% (w/w), from about 0.01% (w/w) to about 0.8% (w/w), from about 0.01% (w/w) to about 0.7% (w/w), from about 0.01% (w/w) to about 0.6% (w/w), from about 0.01% (w/w) to about 0.5% (w/w), from about 0.01% (w/w) to about 0.4% (w/w), from about 0.01% (w/w) to about 0.3% (w/w), from about 0.01% (w/w) to about 0.2% (w/w), from about 0.01% (w/w) to about 0.1% (w/w), from about 0.01% (w/w) to about 0.09% (w/w), from about 0.01% (w/w) to about 0.08% (w/w), from about 0.01% (w/w) to about 0.07% (w/w), from about 0.01% (w/w) to about 0.06% (w/w), from about 0.01% (w/w) to about 0.05% (w/w), from about 0.01% (w/w) to about 0.04% (w/w), from about 0.01% (w/w) to about 0.03% (w/w), or from about 0.01% (w/w) to about 0.02% (w/w). With the benefit of this disclosure, one of ordinary skill in the art will be readily able to prepare a suspension having a sufficient concentration of clay-based stabilizer for a given application.

The elastomer particle suspension further comprises a surfactant. Generally, the surfactant may be used to maintain homogeneity of the suspension and prevent the elastomer particles from floating. Examples of the surfactant generally include, but are not limited to, anionic surfactants, non-ionic surfactants, or a combination thereof. Specific examples of the surfactant include, but are not limited to, ethoxylated nonylphenol including ethoxylated nonylphenol with varying moles of ethylene oxide, triethanolamine, polyethylene glycol, polypropylene glycol, sulfonated acetone formaldehyde condensate, a fatty acid amine condensate, or any combination thereof.

The concentration of the surfactant in the suspension may range from about 0.01% (w/w) to about 5% (w/w). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the surfactant in the suspension may range from about 0.01% (w/w) to about 5% (w/w), from about 0.02% (w/w) to about 5% (w/w), from about 0.03% (w/w) to about 5% (w/w), from about 0.04% (w/w) to about 5% (w/w), from about 0.05% (w/w) to about 5% (w/w), from about 0.06% (w/w) to about 5% (w/w), from about 0.07% (w/w) to about 5% (w/w), from about 0.08% (w/w) to about 5% (w/w), from about 0.09% (w/w) to about 5% (w/w), from about 0.1% (w/w) to about 5% (w/w), from about 0.2% (w/w) to about 5% (w/w), from about 0.3% (w/w) to about 5% (w/w), from about 0.4% (w/w) to about 5% (w/w), from about 0.5% (w/w) to about 5% (w/w), from about 0.6% (w/w) to about 5% (w/w), from about 0.7% (w/w) to about 5% (w/w), from about 0.8% (w/w) to about 5% (w/w), from about 0.9% (w/w) to about 5% (w/w), from about 1% (w/w) to about 5% (w/w), from about 2% (w/w) to about 5% (w/w), from about 3% (w/w) to about 5% (w/w), or from about 4% (w/w) to about 5% (w/w). As another example, the concentration of the surfactant in the suspension may range from about 0.01% (w/w) to about 5% (w/w), from about 0.01% (w/w) to about 4% (w/w), from about 0.01% (w/w) to about 3% (w/w), from about 0.01% (w/w) to about 2% (w/w), from about 0.01% (w/w) to about 1% (w/w), from about 0.01% (w/w) to about 0.9% (w/w), from about 0.01% (w/w) to about 0.8% (w/w), from about 0.01% (w/w) to about 0.7% (w/w), from about 0.01% (w/w) to about 0.6% (w/w), from about 0.01% (w/w) to about 0.5% (w/w), from about 0.01% (w/w) to about 0.4% (w/w), from about 0.01% (w/w) to about 0.3% (w/w), from about 0.01% (w/w) to about 0.2% (w/w), from about 0.01% (w/w) to about 0.1% (w/w), from about 0.01% (w/w) to about 0.09% (w/w), from about 0.01% (w/w) to about 0.08% (w/w), from about 0.01% (w/w) to about 0.07% (w/w), from about 0.01% (w/w) to about 0.06% (w/w), from about 0.01% (w/w) to about 0.05% (w/w), from about 0.01% (w/w) to about 0.04% (w/w), from about 0.01% (w/w) to about 0.03% (w/w), or from about 0.01% (w/w) to about 0.02% (w/w). With the benefit of this disclosure, one of ordinary skill in the art will be readily able to prepare a suspension having a sufficient concentration of surfactant for a given application.

The suspension of the elastomer particles is an aqueous suspension comprising an aqueous fluid. Examples of aqueous fluids include, but are not limited to, freshwater, saltwater (e.g., water containing one or more salts dissolved therein), brine (e.g., saturated saltwater, which may be produced from subterranean formations), seawater, or any combination thereof. Generally, the aqueous fluid may be from any source provided that the aqueous fluid does not contain an excess of compounds that may undesirably affect other components in the elastomer particle suspension. In the case of salt waters and brines, the aqueous fluid may comprise a monovalent salt or a divalent salt. Suitable monovalent salts may include, for example, sodium chloride salt, sodium bromide salt, potassium chloride salt, potassium bromide salt, and the like. Suitable divalent salt can include, for example, magnesium chloride salt, calcium chloride salt, calcium bromide salt, and the like. One of ordinary skill in the art, with the benefit of this disclosure, should be readily able to select an aqueous fluid for a chosen application.

After preparation, the suspension of the elastomer particles may be stored. During storage, the suspension may remain stable without agitation. The suspension may remain stored at ambient condition (e.g., 80° F.). The suspension may be pourable after storage and may not require resuspension of the elastomer particles. In some examples, the suspension may remain pourable and not require resuspension of the elastomer particles after storage of at least one day. In other examples, the suspension may remain pourable and not require resuspension of the elastomer particles after storage of at least two days. In still other examples, the suspension may remain pourable and not require resuspension of the elastomer particles after storage of at least seven days. In still further examples, the suspension may remain pourable and not require resuspension of the elastomer particles after storage of at least thirty days. In still additional examples, the suspension may remain pourable and not require resuspension of the elastomer particles after storage of at least sixty days. When desired for use, the suspension of elastomer particles may be removed from storage and combined with a cement slurry to form a cement composition as detailed below. As the elastomer particles are already suspended in a liquid suspension, the elastomer particles are not dry blended with the dry cement components. The suspension of elastomer particles is instead combined with a cement slurry comprising at least a cement and base fluid.

Examples of the compositions, methods, and systems described herein comprise the use of a cement composition. As previously mentioned, the cement composition comprises a cement, a base fluid, and the suspension of the elastomer particles. Any of a variety of cements suitable for use in subterranean cementing operations may be used in the cement composition. Suitable examples include hydraulic cements that comprise calcium, aluminum, silicon, oxygen, and/or sulfur, and which set and harden by reaction with water. Such hydraulic cements include, but are not limited to, Portland cements, pozzolan cements, gypsum cements, high-alumina-content cements, slag cements, silica/lime cements, Sorel cement, or any combination thereof. In certain specific examples, the hydraulic cement may comprise a Portland cement. The Portland cements that may be suitable for use include Portland cements classified as Class A, C, H and G cements according to the American Petroleum Institute, Recommended Practice for Testing Well Cements, API Specification 10B-2 (ISO 10426-2), First Ed., July 2005. Examples of pozzolan cements may include, but are not limited to, fly ash, silica fume, metakaolin, granulated blast furnace slag, calcined shale, opaline shale, pumice, pumicite, diatomaceous earth, volcanic ash, tuft, cement kiln dust, and any combination thereof. A variety of fly ash may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime, so it may set to form a hardened mass upon mixing with water. Class F fly ash generally does not contain a sufficient amount of lime (calcium source) to induce a cementitious reaction on its own. In addition, in some examples, cements suitable for use may include cements classified as ASTM Type I, II, III, IV, or V. With the benefit of this disclosure, one of ordinary skill in the art will be readily able to select a cement for a cement composition for a given application.

The concentration of the cement in the cement composition may range from about 1% (w/w) to about 99% (w/w). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the cement in the cement composition may range from about 1% (w/w) to about 99% (w/w), from about 5% (w/w) to about 99% (w/w), from about 10% (w/w) to about 99% (w/w), from about 15% (w/w) to about 99% (w/w), from about 20% (w/w) to about 99% (w/w), from about 25% (w/w) to about 99% (w/w), from about 30% (w/w) to about 99% (w/w), from about 35% (w/w) to about 99% (w/w), from about 40% (w/w) to about 99% (w/w), from about 45% (w/w) to about 99% (w/w), from about 50% (w/w) to about 99% (w/w), from about 55% (w/w) to about 99% (w/w), from about 60% (w/w) to about 99% (w/w), from about 65% (w/w) to about 99% (w/w), from about 70% (w/w) to about 99% (w/w), from about 75% (w/w) to about 99% (w/w), from about 80% (w/w) to about 99% (w/w), from about 85% (w/w) to about 99% (w/w), from about 90% (w/w) to about 99% (w/w), or from about 95% (w/w) to about 99% (w/w). As another example, the concentration of the cement in the cement composition may range from about 1% (w/w) to about 99% (w/w), from about 1% (w/w) to about 95% (w/w), from about 1% (w/w) to about 90% (w/w), from about 1% (w/w) to about 85% (w/w), from about 1% (w/w) to about 80% (w/w), from about 1% (w/w) to about 75% (w/w), from about 1% (w/w) to about 70% (w/w), from about 1% (w/w) to about 65% (w/w), from about 1% (w/w) to about 60% (w/w), from about 1% (w/w) to about 55% (w/w), from about 1% (w/w) to about 50% (w/w), from about 1% (w/w) to about 45% (w/w), from about 1% (w/w) to about 40% (w/w), from about 1% (w/w) to about 35% (w/w), from about 1% (w/w) to about 30% (w/w), from about 1% (w/w) to about 25% (w/w), from about 1% (w/w) to about 20% (w/w), from about 1% (w/w) to about 15% (w/w), from about 1% (w/w) to about 10% (w/w), or from about 1% (w/w) to about 5% (w/w). With the benefit of this disclosure, one of ordinary skill in the art will be readily able to prepare a cement composition having a sufficient concentration of cement for a given application.

In some optional examples, the cement compositions may further comprise hydrated lime. As used herein, the term "hydrated lime" will be understood to mean calcium hydroxide. In some examples, the hydrated lime may be provided as quicklime (calcium oxide) which hydrates when mixed with water to form the hydrated lime. The hydrated lime may be included to form a hydraulic composition with the cement. Where present, the hydrated lime may be included in the cement compositions in an amount in the range of from about 10% to about 100% by weight of the cement. In some examples, the hydrated lime may be present in an amount ranging between and/or including any of about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100% by weight of the cement. With the benefit of this disclosure, one of ordinary skill in the art will be readily able to prepare a cement composition having a sufficient concentration of hydrated lime for a given application.

The cement compositions described herein comprise an aqueous fluid for use as a base fluid. Examples of the aqueous fluid include, but are not limited to, freshwater, saltwater (e.g., water containing one or more salts dissolved therein), brine (e.g., saturated saltwater produced from subterranean formations), seawater, or any combination thereof. Generally, the aqueous fluid may be from any source provided that the aqueous fluid does not contain an excess of compounds that may undesirably affect other components in the cement composition. In the case of salt waters and brines, the aqueous fluid may comprise a monovalent salt or a divalent salt. Suitable monovalent salts may include, for example, sodium chloride salt, sodium bromide salt, potassium chloride salt, potassium bromide salt, and the like. Suitable divalent salt can include, for example, magnesium chloride salt, calcium chloride salt, calcium bromide salt, and the like. One of ordinary skill in the art, with the benefit of this disclosure, should be readily able to select an aqueous fluid for a chosen application.

Further, the base fluid may be present in an amount sufficient to form a pumpable slurry. The concentration of the base fluid in the cement composition may range from about 25% (w/w) to about 80% (w/w). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the base fluid in the cement composition may range from about 25% (w/w) to about 80% (w/w), from about 30% (w/w) to about 80% (w/w), from about 35% (w/w) to about 80% (w/w), from about 40% (w/w) to about 80% (w/w), from about 45% (w/w) to about 80% (w/w), from about 50% (w/w) to about 80% (w/w), from about 55% (w/w) to about 80% (w/w), from about 60% (w/w) to about 80% (w/w), from about 65% (w/w) to about 80% (w/w), from about 70% (w/w) to about 80% (w/w), or from about 75% (w/w) to about 80% (w/w). As another example, the concentration of the base fluid in the cement composition may range from about 25% (w/w) to about 80% (w/w), from about 25% (w/w) to about 75% (w/w), from about 25% (w/w) to about 70% (w/w), from about 25% (w/w) to about 65% (w/w), from about 25% (w/w) to about 60% (w/w), from about 25% (w/w) to about 55% (w/w), from about 25% (w/w) to about 50% (w/w), from about 25% (w/w) to about 45% (w/w), from about 25% (w/w) to about 40% (w/w), from about 25% (w/w) to about 35% (w/w), or from about 25% (w/w) to about 30% (w/w). With the benefit of this disclosure, one of ordinary skill in the art will be readily able to prepare a cement composition having a sufficient concentration of base fluid to form a pumpable slurry.

Optionally, the cement composition may further comprise a cement set retarder. A broad variety of cement set retarders may be suitable for use. For example, the cement set retarder may comprise phosphonic acids, such as ethylenediamine tetra(methylene phosphonic acid), diethylenetriamine penta (methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable cement set retarders include, among others, phosphonic acid derivatives. Generally, the cement set retarder may be present in the cement composition in an amount sufficient to delay setting for a desired time. The cement set retarder may be present in the cement composition in an amount in a range from about 0.01% to about 10% by weight of the cement. More particularly, the cement set retarder may be present in an amount ranging between any of and/or including any of about 0.01%, about 0.1%, about 1%, about 2%, about 4%, about 6%, about 8%, or about 10% by weight of the cement. One of ordinary skill in the art, with the benefit of this disclosure, should recognize the appropriate amount of the cement set retarder to include for a chosen application.

Optionally, the cement compositions may further comprise a dispersant. Where present, the dispersant should act, among other things, to control the rheology of the cement composition. While a variety of dispersants known to those skilled in the art may be used, examples of particular dispersants include, but are not limited to, naphthalene sulfonic acid condensate with formaldehyde; acetone, formaldehyde, and sulfite condensate; melamine sulfonate condensed with formaldehyde; sulfonated-formaldehyde-based dispersants (e.g., sulfonated acetone formaldehyde condensate), polycarboxylated ether dispersants, or any combination thereof. In some examples, the dispersant may be present in the cement composition in an amount in a range from about 0.1% to about 5% by weight of the cement. With the benefit of this disclosure, one of ordinary skill in the art will be readily able to prepare a cement composition having a sufficient concentration of dispersant for a given application.

Other optional additives suitable for use in subterranean cementing operations may also be added to the cement compositions. Examples of such additives include, but are not limited to, strength-retrogression additives, set accelerators, weighting agents, lightweight additives, gas-generating additives, mechanical property enhancing additives, lost-circulation materials, fluid-loss-control additives, foaming additives, thixotropic additives, and any combination thereof. Specific examples of these, and other, additives include crystalline silica, amorphous silica, fumed silica, salts, fibers, hydratable clays, calcined shale, vitrified shale, microspheres, fly ash, diatomaceous earth, metakaolin, ground perlite, rice husk ash, natural pozzolan, zeolite, cement kiln dust, resins, any combination thereof, and the like. A person having ordinary skill in the art, with the benefit of this disclosure, will readily be able to determine the type and amount of additive useful for a particular application and desired result.

Strength-retrogression additives may be included in examples of the cement composition to prevent the retrogression of strength after the cement composition has been allowed to set. These additives may allow the cement composition to form as intended, preventing cracks and premature failure of the cement composition. Examples of suitable strength-retrogression additives may include, but are not limited to, amorphous silica, coarse grain crystalline silica, fine grain crystalline silica, or a combination thereof.

Set accelerators may be included in examples of the cement composition to increase the rate of the setting reaction. Control of setting time may provide the ability to adjust to wellbore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof.

Weighting agents may be included in examples of the cement composition to increase the density of the cement composition. Examples of suitable weighting agents include, but are not limited to, ground barium sulfate, barite, hematite, calcium carbonate, siderite, ilmenite, magnesium oxide, sand, salt, or a combination thereof.

Lightweight additives may be included in examples of the cement composition to decrease the density of the cement composition. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Gas-generating additives may be included in examples of the cement composition to release gas at a predetermined time, which may be beneficial to prevent gas migration from the formation through the cement composition before it hardens. The generated gas may combine with or inhibit the permeation of the cement composition by formation gas. Examples of suitable gas-generating additives include, but are not limited to, metal particles (e.g., aluminum powder) that react with an alkaline solution to generate a gas.

Mechanical-property-enhancing additives may be included in examples of the cement composition to ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Lost-circulation materials may be included in examples of the cement composition to help prevent the loss of fluid circulation into the subterranean formation. Examples of lost-circulation materials include, but are not limited to, cedar bark, shredded cane stalks, mineral fiber, mica flakes, cellophane, calcium carbonate, ground rubber, polymeric materials, pieces of plastic, grounded marble, wood, nut hulls, formica, corncobs, and cotton hulls.

Fluid-loss-control additives may be included in examples of the cement composition to decrease the volume of fluid that is lost to the subterranean formation. Properties of the cement composition may be significantly influenced by their water content. The loss of fluid can subject the cement composition to degradation or complete failure of design properties. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers comprising a backbone of lignin or lignite and pendant groups comprising at least one member selected from the group consisting of 2-acrylamido-2-methylpropanesulfonic acid, acrylonitrile, and N,N-dimethylacrylamide.

Foaming additives may be included in examples of the cement composition to facilitate foaming and/or stabilize the resultant foam formed therewith. Examples of suitable foaming additives include, but are not limited to, mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof.

Defoaming additives may be included in examples of the cement composition to reduce the tendency of the cement composition to foam during mixing and pumping of the settable compositions. Examples of suitable defoaming additives include, but are not limited to, polyol silicone compounds.

Thixotropic additives may be included in examples of the cement composition to provide a settable composition that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water-soluble carboxyalkyl, hydroxyalkyl, mixed carboxyalkyl hydroxyalkyl of either cellulose, polyvalent metal salts, zirconium oxychloride with hydroxyethyl cellulose, or a combination thereof.

Those of ordinary skill in the art will appreciate that the slurry of the cement composition has a density suitable for a particular application. By way of example, the cement composition may have a slurry density of about 4 pounds per gallon ("lb/gal") to about 20 lb/gal. In certain examples, the cement composition may have a slurry density of about 8 lb/gal to about 18 lb/gal. As discussed above, the cement composition may achieve these densities without foaming and/or without other means of reducing density, such as lightweight additives. In some alternative examples, the cement composition may comprise weighting agents or other means to increase the slurry density of the cement composition. Those of ordinary skill in the art, with the benefit of this disclosure, will recognize the appropriate density for a particular application.

The cement compositions may set to have a desirable compressive strength after activation. Compressive strength is generally the capacity of a material or structure to withstand axially-directed pushing forces. The compressive strength may be measured at a specified time while the cement composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Texas. Compressive strength values may be determined in accordance with API RP 10B-2, Recommended Practice for Testing Well Cements, First Ed., July 2005.

By way of example, the cement composition may develop a 24-hour compressive strength in a range from about 50 psi to about 1500 psi; alternatively, from about 100 psi to about 1200 psi; or alternatively, from about 150 psi to about 1000 psi. In particular, the cement compositions may develop a compressive strength in 24 hours of at least about 50 psi, at least about 100 psi, at least about 200 psi, or more. The compressive strength values may be determined using destructive or non-destructive methods at any temperature. In some examples, the cement composition may develop a 24-hour compressive strength in a range from about 100 psi to about 800 psi and a slurry density of less than 14 lb/gal. As a specific example, the cement composition may have a compressive strength greater than 500 psi and a slurry density of 13 lb/gal.

The cement composition has a desirable thickening time for any number of applications. Thickening time typically refers to the time a fluid, such as a cement composition slurry, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. The cement composition may have a thickening time greater than about 30 minutes, greater than about 1 hour, greater than about 2 hours, greater than about 3 hours, greater than about 4 hours, greater than about 5 hours, greater than about 10 hours, greater than about 15 hours, or greater than about 30 hours at 3,000 psi and temperatures in a range of from about 50° F. to about 400° F.

As will be appreciated by those of ordinary skill in the art, the cement composition may be used in a variety of subterranean operations, including primary and remedial cementing. For example, a cement composition may be provided that comprises a cement, a base fluid, and the suspension of elastomer particles. The cement composition components may be mixed to provide a composition having a desirable density. The cement composition may then be introduced into a subterranean formation and allowed to set therein. As used herein, introducing the cement composition into a subterranean formation includes introduction into any portion of the subterranean formation, including, without limitation, into a wellbore drilled into the subterranean formation, into a near wellbore region surrounding the wellbore, or into both.

In primary cementing applications, for example, a cement composition may be introduced into an annular space between a conduit located in a wellbore and the walls of a wellbore (and/or a larger conduit in the wellbore), wherein the wellbore penetrates the subterranean formation. The cement composition may be allowed to set in the annular space to form a hardened annular sheath. The set cement composition may form a barrier that prevents the migration of fluids in the wellbore. The set cement composition may also be used to support the conduit in the wellbore.

In remedial cementing applications, the cement composition may be used, for example, in squeeze-cementing operations or in the placement of plugs. By way of example, the cement composition may be placed in a wellbore to plug an opening (e.g., a void or crack) in the formation, in a gravel pack, in the conduit, in the annular sheath, and/or between the annular sheath and the conduit (e.g., a microannulus).

Example systems may comprise a pump fluidly coupled to a tubular, the tubular containing a cement composition as described herein. The pump may be a high-pressure pump or a low-pressure pump. As used herein, the term "high pressure pump" will refer to a pump that is capable of delivering a fluid downhole at a pressure of about 1000 psi or greater. Suitable high-pressure pumps will be known to one having ordinary skill in the art and may include, but are not limited to, floating piston pumps and positive displacement pumps. In other examples, the pump may be a low-pressure pump. As used herein, the term "low pressure pump" will refer to a pump that operates at a pressure of about 1000 psi or less. Suitable low-pressure pumps will be known to one having ordinary skill in the art.

In some examples, the systems described herein may further comprise a mixing tank that is upstream of the pump and is the vessel in which the cement composition is formulated and prepared as a slurry. In various examples, the pump (e.g., a low-pressure pump, a high-pressure pump, or a combination thereof) may convey the cement composition from the mixing tank to the transporting conduit. In other examples, the cement composition may be formulated off-site and transported to a worksite, in which case the cement composition may be introduced to the transporting conduit via the pump either directly from its shipping container (e.g., a truck, a railcar, a barge, or the like) or from a transport pipeline. In either case, the cement composition may be drawn into the pump, elevated to an appropriate pressure, and then introduced into the transporting conduit for delivery downhole.

When desired for use, the elastomer particle suspension may be added to the cement slurry, with or without any additives, without dry blending the elastomer particles and the dry cement. In alternative examples, the cement slurry may be added to the elastomer particle suspension, with or without any additives, without dry blending the elastomer particles and the dry cement. The components and additives of the cement composition may be added to or combined with one another in any order and at any time during the use of the cement composition.

With reference to FIG. 1, preparation of a cement composition will now be described. FIG. 1 is a schematic illustrating a system 2 for the preparation of the cement composition and its subsequent delivery to a wellbore. As shown, the cement composition may be stored in a vessel 4 and then pumped via pumping equipment 6 to the wellbore. The vessel 4 and the pumping equipment 6 may be disposed on one or more cement trucks as will be apparent to those of ordinary skill in the art. The cement composition may be stored as a slurry or prepared as a slurry in the vessel 4. The elastomer particle suspension may be added to the cement slurry in the vessel 4. In some alternative examples, the elastomer particle suspension may be stored and/or prepared in vessel 4. Preparation of the elastomer particle suspension may generally comprise combining the solid dry elastomer particles with an aqueous fluid, the viscosifier, the clay-based stabilizer, and the surfactant in any order and mixing to achieve a homogenous suspension. A cement slurry may then be combined with the elastomer particle suspension by adding the cement slurry to the elastomer particle suspension or vice versa thereby providing the cement composition. In some alternative examples, the elastomer particle suspension may be combined with the cement slurry as one or the other is being pumped from the vessel 4. Alternatively, the elastomer particle suspension may be combined with the cement slurry after the cement slurry has been pumped into the wellbore. In some examples, a jet mixer may be used, for example, to continuously mix the elastomer particle suspension and the cement slurry as it is being pumped to the wellbore. Alternatively, a re-circulating mixer and/or a batch mixer may be used to mix the elastomer particle suspension and the cement slurry. Additionally, batch mixer type units may be plumbed in line with a separate vessel containing the elastomer particle suspension. The elastomer particle suspension may then be fed in-line with the cement slurry as it is pumped out of the vessel 4. Any method for preparing or mixing the elastomer particle suspension with the cement slurry to provide the cement composition may be suitable, and one having ordinary skill in the art with the benefit of this disclosure will be able to prepare, mix, and pump the cement composition using the equipment on hand.

Figure 2:
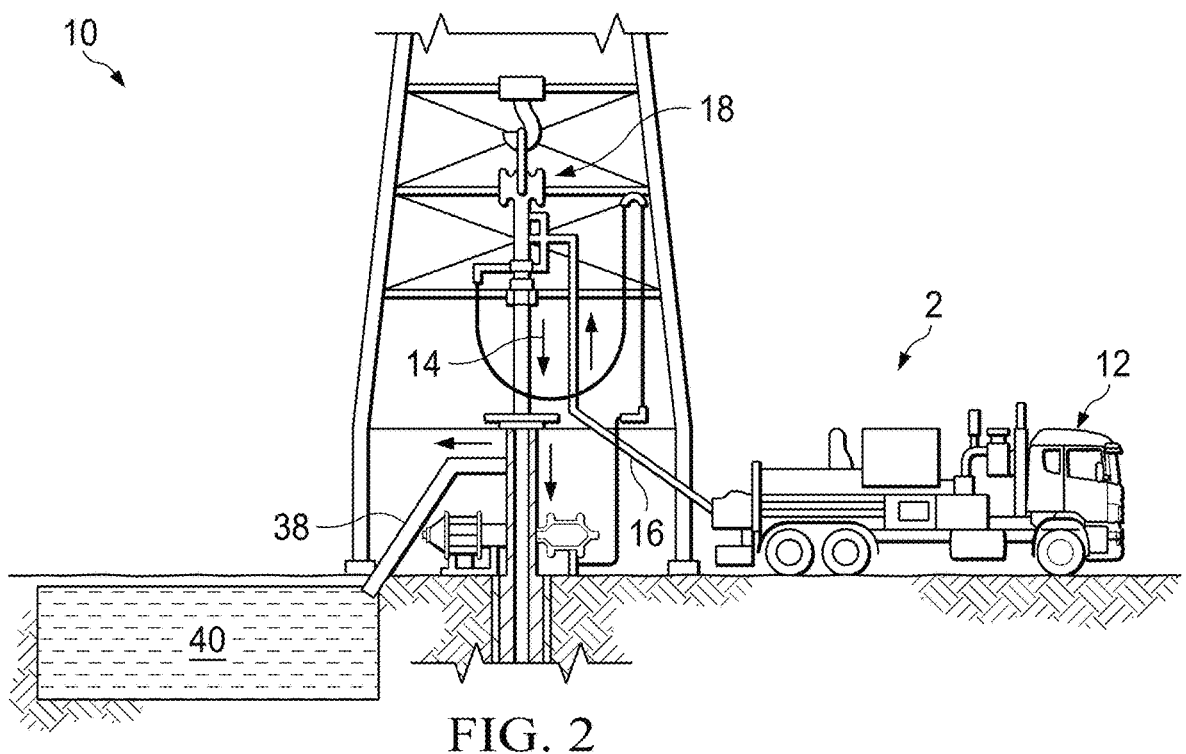
FIG. 2 is a schematic illustrating surface equipment that may be used in the placement of a cement composition in a wellbore in accordance with one or more examples described herein.

An example technique for placing a cement composition into a subterranean formation will now be described with reference to FIG. 2. FIG. 2 is a schematic illustrating surface equipment 10 that may be used in the placement of a cement composition 14 in accordance this disclosure. The cement composition 14 comprises a cement slurry combined with the suspension of elastomer particles. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include the vessel 4 and the pumping equipment 6 shown in FIG. 1, which is represented by system 2 on the cementing unit 12, as will be apparent to those of ordinary skill in the art. The cementing unit 12 may pump a cement composition 14 through a feed pipe 16 and to a cementing head 18, which conveys the cement composition 14 downhole.

Figure 3:
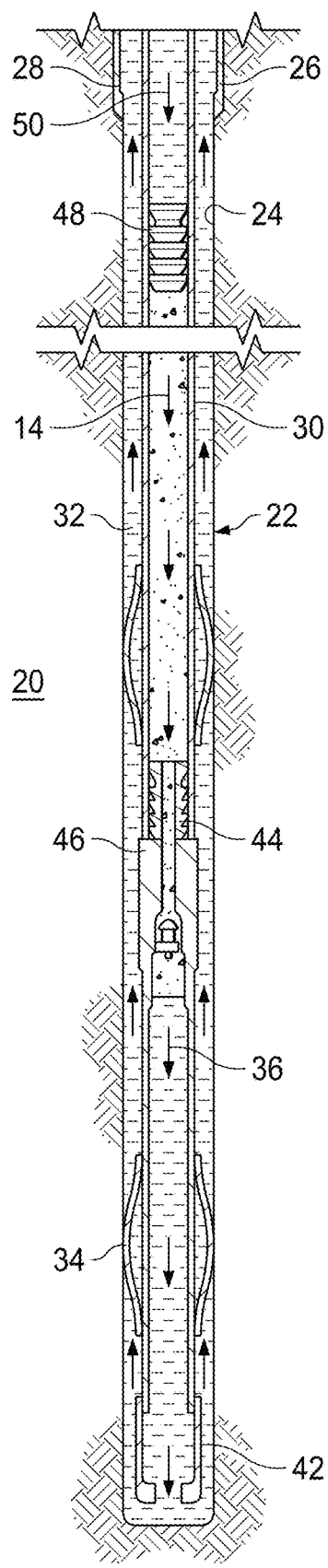
FIG. 3 is a schematic illustrating the placement of a cement composition into a wellbore annulus in accordance with one or more examples described herein.

FIG. 3 is a schematic illustrating the placement of the cement composition 14 into a subterranean formation 20. As illustrated, a wellbore 22 may be drilled into the subterranean formation 20. While the wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated schematic, a surface casing 26 has been inserted into the wellbore 22. The surface casing 26 may be cemented to the walls 24 of the wellbore 22 by cement sheath 28. In the illustrated schematic, one or more additional conduits (e.g., intermediate casing, production casing, liners, etc.), shown here as casing 30, may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 3, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form an annular sheath that supports and positions the casing 30 in the wellbore 22. While not illustrated, other techniques may also be utilized for introduction of the cement composition 14. By way of example, reverse circulation techniques may be used. These techniques may include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2. Referring again to FIG. 3, a bottom plug 44 may be introduced into the wellbore 22 ahead of the cement composition 14, for example, to separate the cement composition 14 from the displaced fluids 36 that may be inside the casing 30 prior to cementing. After the bottom plug 44 reaches the landing collar 46, a diaphragm or other suitable device should rupture to allow the cement composition 14 through the bottom plug 44. In FIG. 3, the bottom plug 44 is shown on the landing collar 46. In the illustrated schematic, a top plug 48 may be introduced into the wellbore 22 behind the cement composition 14. The top plug 48 may separate the cement composition 14 from a displacement fluid 50 and also push the cement composition 14 through the bottom plug 44. The cement composition 14 may then follow the path of the prior pumped displaced fluids 36 and be pumped downhole through the casing shoe 42 and then uphole into the wellbore annulus 32 to its desired destination where it may be allowed to thicken and set.

It should be clearly understood that the cement compositions, systems, and techniques illustrated by FIGS. 1-3 are merely general applications of the principles of this disclosure in practice, and a wide variety of other examples are possible. Therefore, the scope of this disclosure is not limited in any manner to the details of FIGS. 1-3 as described herein.

EXAMPLES

The present disclosure may be better understood by reference to the following examples, which are offered by way of illustration. The present disclosure is not limited to the examples provided herein.

Example 1

An aqueous suspension of elastomer particles was prepared as described herein. The formulation was provided to achieve a 20% (w/w) concentration of the elastomer particles for a total suspension of 1000 g. The elastomer particles were styrene-butadiene rubber. The clay-based stabilizer was synthetic magnesium silicate clay. The surfactant was ethoxylated nonylphenol. The viscosifier was diutan gum. The formulation is illustrated by Table 1 below.

TABLE 1

| Elastomer Particle Suspension Formulation | |
|---|---|
| Component | Amount (gm) |
| Water | 777.33 |
| NaOH | 1.33 |

TABLE 1-continued

| Elastomer Particle Suspension Formulation | |
|---|---|
| Component | Amount (gm) |
| Clay-based Stabilizer | 7.77 |
| Viscosifier | 0.47 |
| Elastomer Particles | 200.00 |
| Surfactant | 3.33 |
| Defoamer | 10.00 |

Figure 4:
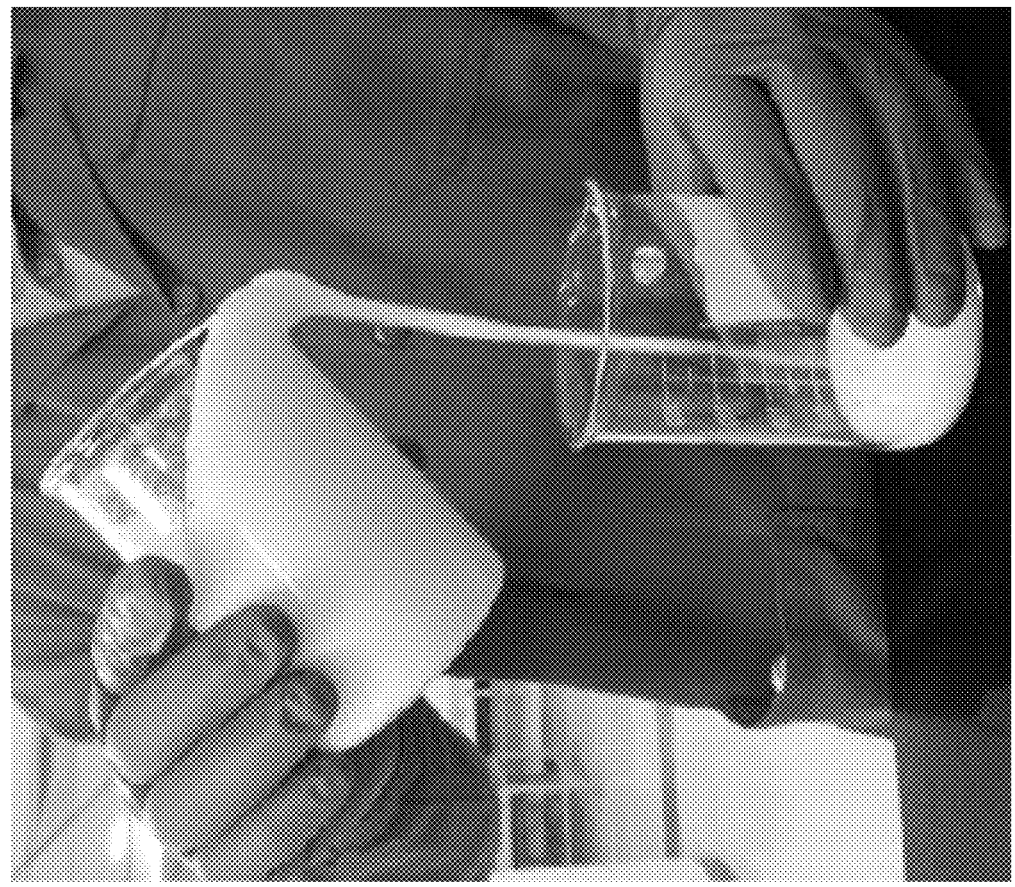
FIG. 4 is a photograph of a stable suspension of elastomer particles after storage for 28 days in accordance with one or more examples described herein.
Figure 4:
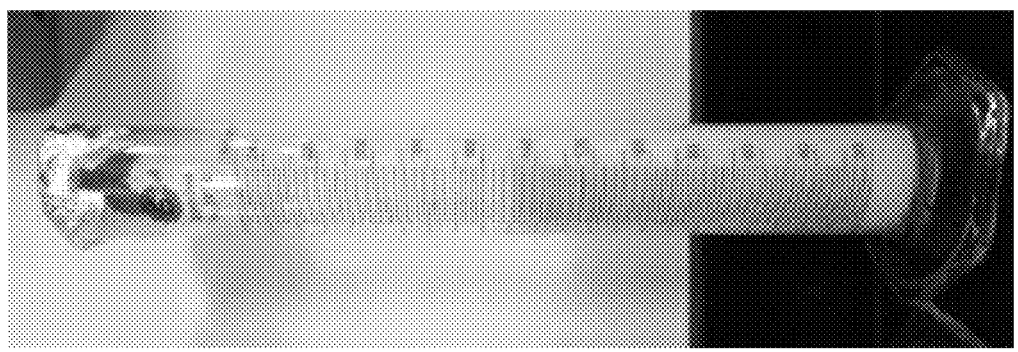
Figure 4:
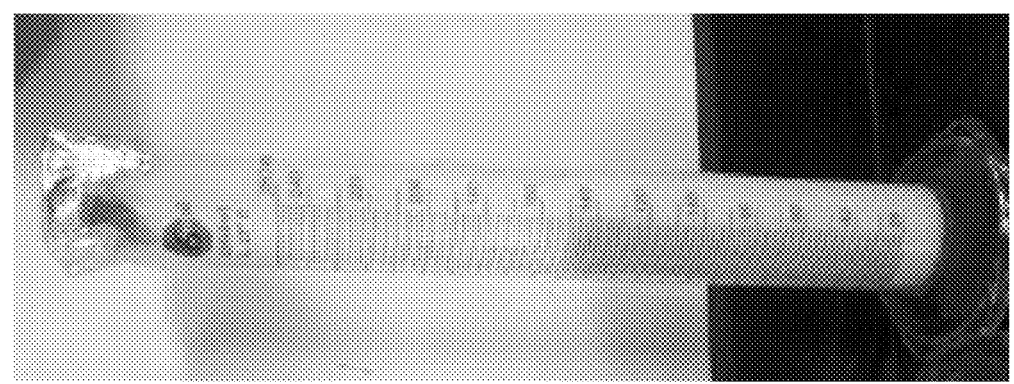

The suspension was kept in a 250 mL measuring cylinder and left to stand for 28 days. FIG. 4 is a series of photographs illustrating the stability of the suspension of elastomer particles after 28 days. There was no separation of the suspension after 28 days, and the elastomer particles remained suspended without agitation or the need for resuspension.

Example 2

A comparative experiment was run to test the mechanical properties of a cement composition prepared via dry blending of elastomer particles as compared to a cement composition prepared with the elastomer particle suspension. The cement compositions comprised the same fixed percentage of components to provide a final cement slurry density of 13.0 lb/gal for each cement slurry formulation. Each slurry formulation had a 10% concentration of elastomer particles by weight of cement concentration. The dry blend formulation had more water added to the slurry, but this is to provide for the water that the elastomer particle suspension contained. Additional water was added to the dry blend slurry so that the overall amount of water is equivalent in each of the final formulations. The dry blend formulation is represented as Composition 1 and the elastomer particle suspension formulation is represented as Composition 2 in Table 2 below.

TABLE 2

| Cement Composition Formulations | | | |
|---|---|---|---|
| Component | Unit | Slurry 1 | Slurry 2 |
| Fresh Water | gal/sk | 9.04 | 4.56 |
| Dyckerhoff Class G Cement | % BWOC | 100.00 | 100.00 |
| Free Water Control Additive | % BWOC | 0.60 | 0.10 |
| Dry Elastomer Particles | % BWOC | 10.00 | — |
| Elastomer Particle Suspension | gal/sk | — | 5.63 |
| Defoamer | gal/sk | 0.08 | 0.08 |

After each composition was prepared according to the formulations of Table 2, the composition slurries were cured in cylindrical molds in a water bath for seven days at 140° F. The Young's modulus, ultimate stress, and Brazilian tensile strength for both slurries were measured and compared. The results are illustrated in Table 3 below.

TABLE 3

| Mechanical Property Comparison | | | | | |
|---|---|---|---|---|---|
| Composition # | Sample 1 | Sample 2 | Sample 3 | Average | Std. Dev. |
| Young's Modulus (Mpsi) | | | | | |
| Composition 1 | 0.527 | 0.505 | 0.530 | 0.521 | 0.014 |
| Composition 2 | 0.579 | 0.543 | 0.539 | 0.554 | 0.022 |

TABLE 3-continued

Mechanical Property Comparison

| Composition # | Sample 1 | Sample 2 | Sample 3 | Average | Std. Dev. |
|---|---|---|---|---|---|
| Ultimate Stress (psi) | | | | | |
| Composition 1 | 797 | 813 | 877 | 829 | 42 |
| Composition 2 | 780 | 774 | 820 | 791 | 25 |
| Brazilian Tensile Strength (psi) | | | | | |
| Composition 1 | 144 | 152 | 161 | 152 | 9 |
| Composition 2 | 140 | 123 | 135 | 133 | 9 |

The mechanical properties of the two compositions were comparable. Sedimentation data for the two compositions was also measured at 140° F. The results are illustrated in Table 4 below.

TABLE 4

Sedimentation Data

| | Density (lb/gal) | | | | | | | |
|---|---|---|---|---|---|---|---|---|
| | 1 (Top) | 2 | 3 | 4 | 5 | 6 (Bottom) | Δ Bottom-Top | Avg. | Std. Dev. |
| Composition 1 | 12.68 | 12.82 | 12.76 | 12.75 | 12.77 | 12.89 | 0.21 | 12.78 | 0.07 |
| Composition 2 | 12.66 | 12.72 | 12.66 | 12.61 | 12.63 | 12.72 | 0.06 | 12.67 | 0.05 |

Additional performance characteristics were measured. The results are illustrated in Table 5 below.

TABLE 5

Performance Comparison

| Performance Tests | Slurry 1 | Slurry 2 |
|---|---|---|
| Mixability (0-5) — 0 is not mixable | 4 | 4 |
| Free Fluid (%) | 0 | 0 |
| Thickening Time, 70 Bc (hh:mm) | 06:05 | 05:06 |
| 50 psi UCA Compressive Strength (hh:mm) | 04:58 | 03:38 |
| 500 psi UCA Compressive Strength (hh:mm) | 10:10 | 08:10 |
| 24 hr UCA Compressive Strength | 816 | 934 |

Rheology data was also obtained for each example slurry. The results are illustrated in Table 6 below.

TABLE 6

Rheology Data on FYSA

| | 80° F. | | | | 100° F. | | | |
|---|---|---|---|---|---|---|---|---|
| | Slurry 1 | | Slurry 2 | | Slurry 1 | | Slurry 2 | |
| RPM | Up | Down | Up | Down | Up | Down | Up | Down |
| 3 | 10 | 8 | 10 | 10 | 4 | 4 | 10 | 10 |
| 6 | 16 | 15 | 12 | 10 | 8 | 8 | 12 | 12 |
| 30 | 38 | 36 | 14 | 14 | 21 | 21 | 13 | 13 |
| 60 | 54 | 52 | 18 | 17 | 33 | 32 | 15 | 15 |
| 100 | 68 | 66 | 22 | 21 | 46 | 45 | 17 | 17 |
| 200 | 95 | 92 | 28 | 26 | 67 | 65 | 23 | 22 |
| 300 | 107 | | 35 | | 76 | | 32 | |
| 600 | 145 | | 68 | | 118 | | 57 | |

A temperature thinning effect was more pronounced in Composition 1 than in Composition 2. This may be due to the amount of free water control additive present in the slurries. Composition 2 already comprises a stable suspension of elastomer particles and thus required less free water control additive in the final formulated slurry than that of the dry blend slurry of Composition 1.

It is also to be recognized that the disclosed cement compositions may also directly or indirectly affect the various downhole equipment and tools that may contact the cement compositions disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1-4.

Provided are methods of cementing in accordance with the disclosure and the illustrated FIGS. An example method comprises providing a suspension of elastomer particles comprising: elastomer particles, an aqueous fluid, a viscosifier, a surfactant, and a clay-based stabilizer. The method further comprises combining the suspension with a cement slurry to form a cement composition; wherein the cement slurry comprises a cement and a base fluid. The method additionally comprises introducing the cement composition into a wellbore penetrating a subterranean formation; and allowing the cement composition to set in the wellbore.

Additionally or alternatively, the method may include one or more of the following features individually or in combination. The elastomer particles may be selected from the group consisting of styrene butadiene, natural rubber, nitrite rubber, butyl rubber, ethylene propylene diene rubber, ethylene propylene rubber, chlorinated polyethylene rubber, polyurethane rubber, polyisoprene rubber, polybutadiene rubber, polyisobutylene rubber, acrylonitrilebutadiene rubber, acrylonitrile-styrene-butadiene rubber, and any combination thereof. The viscosifier may be selected from the group consisting of diutan gum, welan gum, gellan gum, cellulose derivatives, copolymers of 2-acrylamido-2-methyl propane sulfonate and acrylamide, polyvinyl alcohol, polyvinylpyrrolidones, and any combination thereof. The clay-based stabilizer may be selected from the group consisting of magnesium silicate clay, bentonite, sepiolite, attapulgite, phyllosilicates, smectite, hectorites, synthetic versions thereof, and any combination thereof. The clay-based stabilizer may be a synthetic magnesium silicate clay selected from the group consisting of lithium magnesium sodium silicate, lithium magnesium sodium fluorosilicate, and any combination thereof. The surfactant may be selected from the group consisting of ethoxylated nonylphenol, triethanolamine, polyethylene glycol, polypropylene glycol, sulfonated acetone formaldehyde condensate, a fatty acid amine condensate, and any combination thereof. The cement may be selected from the group consisting of Portland cement, pozzolan cement, gypsum cement, high-alumina-content cement, slag cement, silica/lime cement, fly ash, silica fume, metakaolin, granulated blast furnace slag, calcined shale, opaline shale, pumice, pumicite, diatomaceous earth, volcanic ash, tuft, cement kiln dust, Sorel cement, and any combinations thereof. The elastomer particles may not be dry blended with the cement or any dry cement additives during performance of the method. The method may further comprise storing the suspension of elastomer particles for a time of at least one day prior to combing the suspension with the cement slurry; wherein the suspension of elastomer particles is not mixed during the storage time.

Provided are suspensions of elastomer particles in accordance with the disclosure and the illustrated FIGS. An example suspension comprises elastomer particles, an aqueous fluid, a viscosifier, a surfactant, and a clay-based stabilizer.

Additionally or alternatively, the suspension may include one or more of the following features individually or in combination. The elastomer particles may be selected from the group consisting of styrene butadiene, natural rubber, nitrile rubber, butyl rubber, ethylene propylene diene rubber, ethylene propylene rubber, chlorinated polyethylene rubber, polyurethane rubber, polyisoprene rubber, polybutadiene rubber, polyisobutylene rubber, acrylonitrilebutadiene rubber, acrylonitrile-styrene-butadiene rubber, and any combination thereof. The viscosifier may be selected from the group consisting of diutan gum, welan gum, gellan gum, cellulose derivatives, copolymers of 2-acrylamido-2-methyl propane sulfonate and acrylamide, polyvinyl alcohol, polyvinylpyrrolidones, and any combination thereof. The clay-based stabilizer may be selected from the group consisting of magnesium silicate clay, bentonite, sepiolite, attapulgite, phyllosilicates, smectite, hectorites, synthetic versions thereof, and any combination thereof. The clay-based stabilizer may be a synthetic magnesium silicate clay selected from the group consisting of lithium magnesium sodium silicate, lithium magnesium sodium fluorosilicate, and any combination thereof. The surfactant may be selected from the group consisting of ethoxylated nonylphenol, triethanolamine, polyethylene glycol, polypropylene glycol, sulfonated acetone formaldehyde condensate, a fatty acid amine condensate, and any combination thereof. The suspension may be combined with a cement slurry to form a cement composition. The cement composition may comprise a cement and a base fluid. The cement may be selected from the group consisting of Portland cement, pozzolan cement, gypsum cement, high-alumina-content cement, slag cement, silica/lime cement, fly ash, silica fume, metakaolin, granulated blast furnace slag, calcined shale, opaline shale, pumice, pumicite, diatomaceous earth, volcanic ash, tuft, cement kiln dust, Sorel cement, and any combinations thereof. The elastomer particles may not be dry blended with the cement or any dry cement additives to prepare the cement composition.

Provided are systems for cementing in accordance with the disclosure and the illustrated FIGS. An example system comprises elastomer particles, an aqueous fluid, a viscosifier, a surfactant, and a clay-based stabilizer. The system further comprises a cement slurry comprising a cement and a base fluid. The system additionally comprises mixing equipment configured to mix the cement slurry and the suspension of elastomer particles to provide a cement composition, and a pump fluidly coupled to a tubular extending into a wellbore penetrating a subterranean formation; wherein the tubular is configured to circulate or otherwise convey the cement composition in the wellbore.

Additionally or alternatively, the system may include one or more of the following features individually or in combination. The elastomer particles may be selected from the group consisting of styrene butadiene, natural rubber, nitrile rubber, butyl rubber, ethylene propylene diene rubber, ethylene propylene rubber, chlorinated polyethylene rubber, polyurethane rubber, polyisoprene rubber, polybutadiene rubber, polyisobutylene rubber, acrylonitrilebutadiene rubber, acrylonitrile-styrene-butadiene rubber, and any combination thereof. The viscosifier may be selected from the group consisting of diutan gum, welan gum, gellan gum, cellulose derivatives, copolymers of 2-acrylamido-2-methyl propane sulfonate and acrylamide, polyvinyl alcohol, polyvinylpyrrolidones, and any combination thereof. The clay-based stabilizer may be selected from the group consisting of magnesium silicate clay, bentonite, sepiolite, attapulgite, phyllosilicates, smectite, hectorites, synthetic versions thereof, and any combination thereof. The clay-based stabilizer may be a synthetic magnesium silicate clay selected from the group consisting of lithium magnesium sodium silicate, lithium magnesium sodium fluorosilicate, and any combination thereof. The surfactant may be selected from the group consisting of ethoxylated nonylphenol, triethanolamine, polyethylene glycol, polypropylene glycol, sulfonated acetone formaldehyde condensate, a fatty acid amine condensate, and any combination thereof. The cement may be selected from the group consisting of Portland cement, pozzolan cement, gypsum cement, high-alumina-content cement, slag cement, silica/lime cement, fly ash, silica fume, metakaolin, granulated blast furnace slag, calcined shale, opaline shale, pumice, pumicite, diatomaceous earth, volcanic ash, tuft, cement kiln dust, Sorel cement, and any combinations thereof. The elastomer particles may not be dry blended with the cement or any dry cement additives. The suspension of elastomer particles may be stored for a time of at least one day prior to combing the suspension with the cement slurry; wherein the suspension of elastomer particles is not mixed during the storage time.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of the various components and steps." Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for cementing, the method comprising:
preparing a suspension of elastomer particles from components comprising:
solid dry elastomer particles,
an aqueous fluid,
a viscosifier,
a surfactant, and
a clay-based stabilizer;
then combining the suspension with a cement slurry to form a cement composition; wherein the cement slurry comprises a cement and a base fluid;
introducing the cement composition into a wellbore penetrating a subterranean formation; and
allowing the cement composition to set in the wellbore; wherein the elastomer particles impart elasticity to the set cement.

2. The method of claim 1, wherein the elastomer particles are selected from the group consisting of styrene butadiene, natural rubber, nitrile rubber, butyl rubber, ethylene propylene diene rubber, ethylene propylene rubber, chlorinated polyethylene rubber, polyurethane rubber, polyisoprene rubber, polybutadiene rubber, polyisobutylene rubber, acrylonitrilebutadiene rubber, acrylonitrile-styrene-butadiene rubber, and any combination thereof.

3. The method of claim 1, wherein the viscosifier is selected from the group consisting of diutan gum, welan gum, gellan gum, cellulose derivatives, copolymers of 2-acrylamido-2-methyl propane sulfonate and acrylamide, polyvinyl alcohol, polyvinylpyrrolidones, and any combination thereof.

4. The method of claim 1, wherein the clay-based stabilizer is selected from the group consisting of magnesium silicate clay, bentonite, sepiolite, attapulgite, phyllosilicates, smectite, hectorites, synthetic versions thereof, and any combination thereof.

5. The method of claim 4, wherein the clay-based stabilizer is a synthetic magnesium silicate clay selected from the group consisting of lithium magnesium sodium silicate, lithium magnesium sodium fluorosilicate, and any combination thereof.

6. The method of claim 1, wherein the surfactant is selected from the group consisting of ethoxylated nonylphenol, triethanolamine, polyethylene glycol, polypropylene glycol, sulfonated acetone formaldehyde condensate, a fatty acid amine condensate, and any combination thereof.

7. The method of claim 1, wherein the cement is selected from the group consisting of Portland cement, pozzolan cement, gypsum cement, high-alumina-content cement, slag cement, silica/lime cement, fly ash, silica fume, metakaolin, granulated blast furnace slag, calcined shale, opaline shale, pumice, pumicite, diatomaceous earth, volcanic ash, tuft, cement kiln dust, Sorel cement, and any combinations thereof.

8. The method of claim 1, wherein the elastomer particles are not dry blended with the cement or any dry cement additives.

9. The method of claim 1, further comprising storing the suspension of elastomer particles for a time of at least one day prior to combining the suspension with the cement slurry; wherein the suspension of elastomer particles is not mixed during the storage time.

10. A cement composition comprising a suspension of elastomer particles, wherein the cement composition comprises:
a cement selected from the group consisting of Portland cement, pozzolan cement, gypsum cement, high-alumina-content cement, slag cement, silica/lime cement, fly ash, silica fume, metakaolin, granulated blast furnace slag, calcined shale, opaline shale, pumice, pumicite, diatomaceous earth, volcanic ash, tuft, cement kiln dust, Sorel cement, and any combinations thereof,
a base fluid, and
a suspension of elastomer particles comprising:
solid dry elastomer particles,
an aqueous fluid,
a viscosifier,
a surfactant, and
a clay-based stabilizer; wherein the suspension is prepared separately from any cement and is combined with the cement and the base fluid after preparation; and wherein the elastomer particles impart elasticity to the cement composition when the cement composition has set.

11. The cement composition of claim 10, wherein the elastomer particles of the suspension are selected from the group consisting of styrene butadiene, natural rubber, nitrile rubber, butyl rubber, ethylene propylene diene rubber, ethylene propylene rubber, chlorinated polyethylene rubber, polyurethane rubber, polyisoprene rubber, polybutadiene rubber, polyisobutylene rubber, acrylonitrilebutadiene rubber, acrylonitrile-styrene-butadiene rubber, and any combination thereof.

12. The cement composition of claim 10, wherein the viscosifier of the suspension is selected from the group consisting of diutan gum, welan gum, gellan gum, cellulose derivatives, copolymers of 2-acrylamido-2-methyl propane sulfonate and acrylamide, polyvinyl alcohol, polyvinylpyrrolidones, and any combination thereof.

13. The cement composition of claim 10, wherein the clay-based stabilizer of the suspension is selected from the group consisting of magnesium silicate clay, bentonite, sepiolite, attapulgite, phyllosilicates, smectite, hectorites, synthetic versions thereof, and any combination thereof.

14. The suspension of claim 13, wherein the clay-based stabilizer is a synthetic magnesium silicate clay selected from the group consisting of lithium magnesium sodium silicate, lithium magnesium sodium fluorosilicate, and any combination thereof.

15. The cement composition of claim 10, wherein the surfactant of the suspension is selected from the group consisting of ethoxylated nonylphenol triethanolamine, polyethylene glycol, polypropylene glycol, sulfonated acetone formaldehyde condensate, a fatty acid amine condensate and any combination thereof.

16. A system for cementing, the system comprising:
a suspension of elastomer particles produced from components comprising:
solid dry elastomer particles,
an aqueous fluid,
a viscosifier,
a surfactant, and
a clay-based stabilizer;
a cement slurry comprising:
a cement, and
a base fluid;
mixing equipment configured to mix the cement slurry and the suspension of elastomer particles to provide a cement composition; wherein the suspension of elastomer particles and the cement slurry are kept separate until mixed;
a pump fluidly coupled to a tubular extending into a wellbore penetrating a subterranean formation, wherein the tubular is configured to circulate or otherwise convey the cement composition in the wellbore; wherein the elastomer particles impart elasticity to the cement composition when the cement composition has set.

17. The system of claim 16, wherein the elastomer particles are selected from the group consisting of styrene butadiene, natural rubber, nitrile rubber, butyl rubber, ethylene propylene diene rubber, ethylene propylene rubber, chlorinated polyethylene rubber, polyurethane rubber, polyisoprene rubber, polybutadiene rubber, polyisobutylene rubber, acrylonitrilebutadiene rubber, acrylonitrile-styrene-butadiene rubber, and any combination thereof.

18. The system of claim 16, wherein the clay-based stabilizer is selected from the group consisting of magnesium silicate clay, bentonite, sepiolite, attapulgite, phyllosilicates, smectite, hectorites, synthetic versions thereof, and any combination thereof.

19. The system of claim 16, wherein the surfactant is selected from the group consisting of ethoxylated nonylphenol triethanolamine, polyethylene glycol, polypropylene glycol, sulfonated acetone formaldehyde condensate, a fatty acid amine condensate and any combination thereof.

20. The system of claim 16, wherein the viscosifier is selected from the group consisting of diutan gum, welan gum, gellan gum, cellulose derivatives, copolymers of 2-acrylamido-2-methyl propane sulfonate and acrylamide, polyvinyl alcohol, polyvinylpyrrolidones, and any combination thereof.

* * * * *